United States Patent Office 2,883,328
Patented Apr. 21, 1959

2,883,328

PRODUCTION OF CEPHALOSPORIN N

Howard Walter Florey, Edward Penley Abraham, Guy Geoffrey Frederick Newton, and Henry Stowar Burton, Oxford, and Brendan Kevin Kelly, Clifford William Hale, and George Arthur Miller, Clevedon, England No Drawing. Application December 7, 1953
Serial No. 396,742

Claims priority, application Great Britain
December 12, 1952

4 Claims. (Cl. 195—36)

It has been shown (see Crawford, Heatley, Boyd, Hale, Kelly, Miller and Smith, The Journal of General Microbiology 6, 47–59), that a material having antibiotic properties is produced when a certain species of Cephalosporium which is or which resembles *C. acremonium* is grown upon a nutrient medium containing a carbohydrate (e.g. glucose, lactose or starch) and a source of organic nitrogen, such as corn steep liquor in the presence of molecular oxygen. The material comprises a mixture of individual antibiotic substances of which at least one is active predominantly against many gram positive bacteria and of which at least one other exhibits activity of the same order against gram negative and gram positive baceteria. On fractionation the material yields inter alia a penicillinase-sensitive fraction, which is active against many gram negative and gram positive bacteria.

It has also been shown that, of several hundred strains tested, one particular strain of this species, which has since been deposited at the Commonwealth Mycological Institute, Ferry Lane, Kew, Surrey, England, where it has been indexed Cephalosporium I.M.I. 49137 (and has also been deposited with the American Type Culture Collection, Washington, D.C., where it has been indexed as ATCC No. 11550), produces a titre of antibiotic substances which is about six times greater than that produced by the remainder.

We have now discovered that by using a nutrient medium containing sucrose and/or lactose and ammonium acetate, the antibiotic material produced contains a greatly increased proportion of a penicillinase-sensitive substance or substances active against both gram negative and gram positive organisms.

Accordingly the present invention provides a process for the production of a penicillinase-sensitive antibiotic material active against both gram negative and gram positive bacteria which comprises fermenting a nutrient medium containing sucrose and/or lactose, ammonium acetate and a source of organic nitrogen with a mould of the species of which Cephalosporium I.M.I. 49137 is a member in the presence of molecular oxygen and separating the mould and the antibiotic material thereby produced.

For convenience, the penicillinase-sensitive antibiotic substance active against many gram negative and gram positive bacteria will hereinafter be referred to as "Cephalosporin N."

The results obtainable by using sucrose or lactose in the presence of ammonium acetate in accordance with this invention are quite surprising and the increase over the prior process in the proportion of Cephalosporin N, which is about ten-fold, is of a far greater order of magnitude than the change, positive or negative, which such apparently minor variations in the composition of the nutrient medium would be expected to produce. No comparable increase was noticed when other salts such as ammonium sulphate and ammonium phosphate, were substituted for the ammonium acetate or when other carbohydrates, for example maltose, were substituted for the sucrose and/or lactose.

While the actual source of organic nitrogen used in the process is not critical and indeed many of those sources ordinarily used in nutrient media for bacteria and moulds may usefully be employed, our best results to date have all been obtained when using corn steep liquor.

Preferably the nutrient medium contains sufficient of the source of organic nitrogen to provide from 400 to 1600 mg./litre of nitrogen as determined by Kjeldahl's method, from 2 to 9 g./litre of ammonium acetate and from 1 to 4% by weight of the sucrose and/or lactose.

Provided that a suitable temperature is maintained, e.g. 22° C. to 33° C., the conditions of the fermentation are not critical although we have found it preferable in accordance with one feature of the invention to adjust the pH to between 6.5 and 7.4 at the commencement of the fermentation. The present process can be carried out using either aerobic surface-culture or aerobic submerged-culture techniques although the latter are naturally preferred when operating on a large scale.

It will be appreciated that the references herein to Cephalosporin N are not to be taken as implying that this material is necessarily pure in the sense that it contains only one species of molecule.

The invention will be further understood from the following specific examples, which it is to be understood, are not intended to limit the scope of the invention. The units of activity quoted in these examples are arbitrary units. Unless otherwise indicated the proportions quoted are proportions by weight.

*Example 1*

(a) Four flasks were prepared each containing 4 litres of a medium comprising corn steep liquor to provide 400 mg. of organic nitrogen per litre and 2% of glucose. The medium was adjusted to pH 6.8 with caustic soda and sterilized for one hour at 15 lbs./sq. in.

Each flask was then inoculated with 2% by volume of a 72 hour growth of Cephalosporium I.M.I. 49137. This seed was prepared by inoculating spores into 8 litres of a medium comprising corn steep liquor to provide 800 mg. of organic nitrogen per litre and 2% of glucose, incubating at 24° C. while passing air through at 20 litres per minute, and stirring at 300 r.p.m.

The flasks were incubated at 24° C. while passing 6 litres of air per minute through each and stirring at 600 r.p.m.

After 72 hours the mean titre of the four fermentations was 1.0 unit/ml.

(b) Four fermentations were set up in exactly the same way as under (a) except that in the final medium 2% lactose was used in place of 2% glucose.

Mean titre after 72 hours, 3.2 units/ml.

This example illutrates the effect of using lactose in place of glucose.

*Example 2*

Four fermentations were set up exactly as in Example 1 except that in the final medium the lactose was replaced by an equal weight of sucrose.

Mean titre after 72 hours, 3.0 units/ml.

*Example 3*

Sixteen fermentations were set up as in Example 1 with the final medium containing sufficient corn steep liquor to provide 840 mg. of organic nitrogen per litre, 1.33% of sucrose, and 0.67% of glucose. To four fermentations nothing further was added while of the remainder four had 1.1 g. per litre of ammonium acetate added, four had 2.2 g. per litre of ammonium acetate added, and four had 4.4 g. per litre of ammonium acetate added.

All were incubated at 24° C. and stirred and aerated as in Example 1.

After 49 hours the mean titres were found to be as follows:

| | Units/ml. |
|---|---|
| No ammonium acetate | 2.9 |
| 1.1 g. per litre of ammonium acetate | 5.0 |
| 2.2 g. per litre of ammonium acetate | 6.1 |
| 4.4 g. per litre of ammonium acetate | 7.0 |

*Example 4*

Two sets of four fermentations were set up. The procedure differed from Example 1 in that the seed medium contained sufficient corn steep liquor to provide 800 mg. of organic nitrogen per litre, 4.4 g. per litre of ammonium acetate, and 2% of sucrose.

In one set of four fermentations the final medium contained sufficient corn steep liquor to provide 800 gm. of organic nitrogen per litre, 4.4 g. of ammonium acetate per litre, and 2% of sucrose.

In the other set of four fermentations the corn steep liquor was replaced by 267 mg. of organic nitrogen per litre in the form of acid hydrolysed fish meal and 533 mg. of organic nitrogen per litre in the form of a yeast extract known by the trade name "Marmite."

Both sets of fermentations were incubated at 30° C. with stirring at 600 r.p.m. and aeration at 9 litres of air per minute per 4 litres of medium.

After 71 hours the mean titres were found to be as follows:

| | Units/ml. |
|---|---|
| With corn steep liquor | 5.8 |
| With fish meal and "Marmite" | 5.6 |

Those skilled in the art will understand that for certain applications, e.g., the manufacture of additives for animal feeding stuffs, it may be unnecessary to purify or even to isolate the antibiotic substance from the crude fermentation liquors and that it may only be necessary to separate the mould by filtration or at the centrifuge in order to obtain a crude antibiotic material in the form of a fermentation liquor.

It will be appreciated that various departures may be made from the specific procedures described herein without departing from the scope of the invention.

We claim:

1. A process for the production of Cephalosporium N which comprises fermenting in the presence of molecular oxygen with a mould of the species of which Cephalosporium I.M.I. 49137 is a member, a nutrient medium containing ammonium acetate, a source of organic nitrogen and a sugar component selected from the group consisting of sucrose, lactose and mixtures of sucrose and lactose, and separating the mould and the antibiotic material thereby produced.

2. A process according to claim 1 in which the source of organic nitrogen is corn steep liquor.

3. A process according to claim 1 in which the nutrient medium contains sufficient of the source of organic nitrogen to provide from 400 to 1,600 mg./liter of Kjeldahl nitrogen, from 400 to 1,600 mg./liter of ammonium acetate and from 1 to 4% by weight of said sugar component.

4. A process according to claim 1 in which said nutrient medium has a pH between 6.5 and 7.4 at the commencement of said fermentation.

References Cited in the file of this patent

UNITED STATES PATENTS

| 2,432,638 | Wachtel | Dec. 16, 1947 |
| 2,437,766 | Stevenson et al. | Mar. 16, 1948 |
| 2,446,574 | Cavallito et al. | Aug. 10, 1948 |
| 2,479,832 | Grant | Aug. 23, 1949 |
| 2,538,479 | Snyder | Jan. 16, 1951 |
| 2,560,891 | Regna | July 17, 1951 |
| 2,568,360 | Parsons | Sept. 18, 1951 |
| 2,631,964 | Brunings et al. | Mar. 17, 1953 |
| 2,654,690 | Koniuszy et al. | Oct. 6, 1953 |
| 2,658,018 | Gottshall et al. | Nov. 3, 1953 |
| 2,668,137 | Briggs et al. | Feb. 2, 1954 |
| 2,678,297 | McCormick et al. | May 11, 1954 |

OTHER REFERENCES

Cruz-Coke et al.: Science, vol. 101, No. 2622, page 340.

Abraham et al.: Bact. Jour. Exptl. Path., vol. 23, No. 3, pages 103–113, June 1942.

Brook et al.: J. Biol. Chem., vol. 165 (1946), pages 463–468.

Brotza: Bull. of Hygiene, vol. 24, No. 10, October 1949, page 804.

"Antibiotics," vol. II, 1949, by Florey et al., publ. by Oxford Univ. Press (N.Y.), pages 749 to 759.

Reeves: Chem. Eng., January 1952, page 145.

Crawford et al.: J. Gen. Microbiol., 1952, vol. 6, pages 47–59.

"Nature," vol. 171, No. 4347, Feb. 21, 1953, page 343.

Newton et al: Nature, vol. 172, No. 4347, Aug. 29, 1953, page 395.

Olson et al.: Antibiotics and Chemotherapy, vol. 4, No. 1, pages 1 and 5–9, June 1954.

Mfg. Chem., vol. 26, April 1955, pages 168–169.

Mfg. Chem., July 1955, pages 318–319.

J. Pharm. and Pharmacol., vol. 7, No. 7, July 1955, page 484.

Biochem, J., vol. 58 (1955), pages 104–105.